May 5, 1959
F. M. LEWIS
2,884,912
CLOSED CYCLE METHOD OF OPERATING
INTERNAL COMBUSTION ENGINES
Filed Dec. 2, 1948
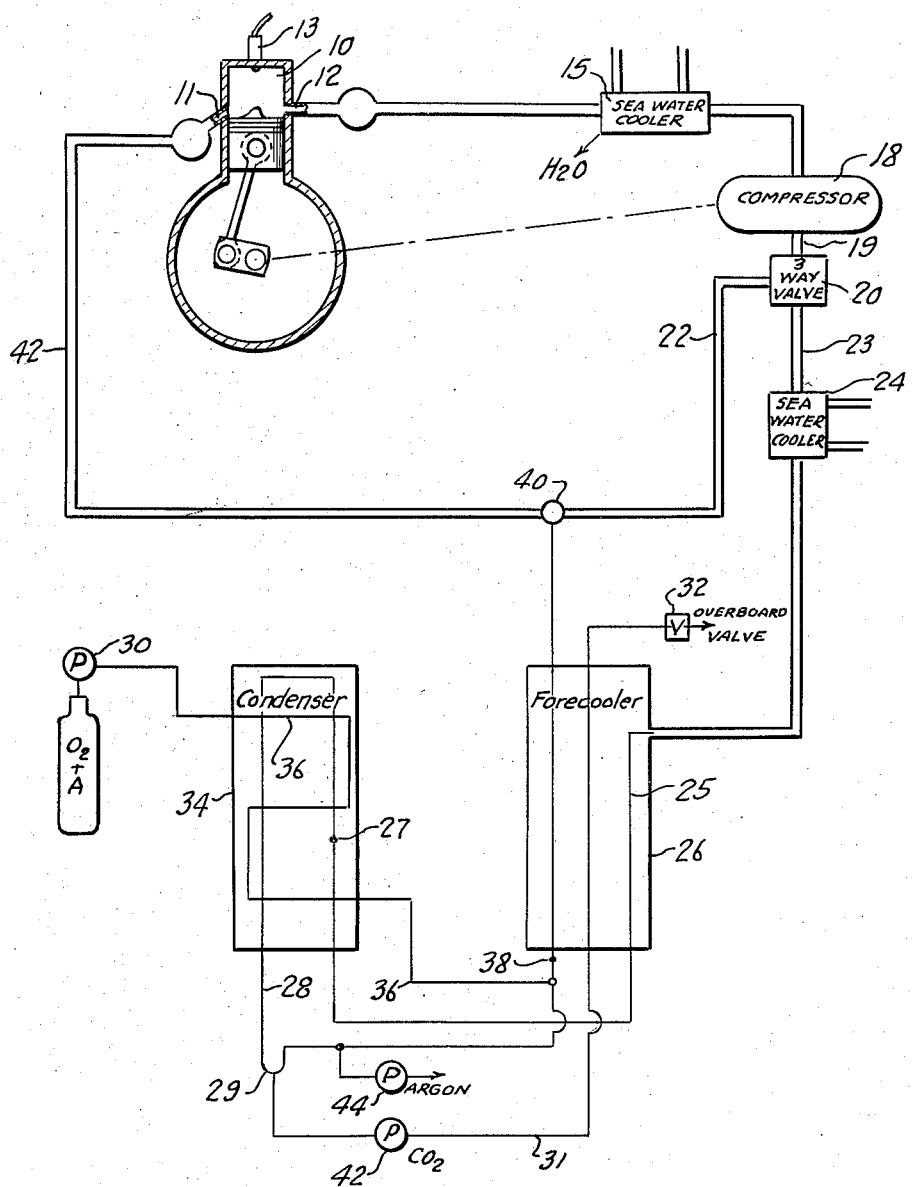
INVENTOR.
Frank M. Lewis
BY
ATTORNEYS

United States Patent Office 2,884,912
Patented May 5, 1959

2,884,912

CLOSED CYCLE METHOD OF OPERATING INTERNAL COMBUSTION ENGINES

Frank M. Lewis, Weston, Mass., assignor, by mesne assignments, to Baldwin-Lima-Hamilton Corporation, a corporation of Pennsylvania Application December 2, 1948, Serial No. 63,161

3 Claims. (Cl. 123—1)

This invention relates to a method of operating internal combustion engines on a closed cycle and is particularly directed to a manner in which certain of the products of combustion are removed.

The primary object of the invention is to provide a method of operation of internal combustion engines in which oxygen for combustion is supplied from a liquified oxygen source and the heat of vaporization of the oxygen is utilized to condense products of combustion coming from the engine to facilitate their removal.

Another object of the invention is to provide a method of operation of internal combustion engines in which carbon dioxide from the products of combustion is removed in a liquified form so that the problem of waste disposal in certain installations is greatly simplified.

Other objects and advantages of the invention will become apparent from the following specification which describes a preferred embodiment of the invention, reference being had to the accompanying diagrammatic disclosure of apparatus suitable for carrying out the method.

Referring to the drawing, 10 designates an internal combustion engine which may be of any suitable type but for convenience is shown as a two-cycle engine having gas inlet ports 11 and exhaust ports 12 communicating with suitable manifolds. A fuel injector 13 is utilized to supply fuel to the combustion cycle, the fuel being of the usual liquid hydrocarbon type.

In accordance with my closed cycle of operation, gas passes from the exhaust manifold to a heat exchanger 15 which may be in the form of a sea water cooler and the gas at this point is cooled sufficiently to remove a large quantity of the entrained water vapor which is one of the products of combustion. The gases passing from cooler 15 will thus be relatively low in water vapor and at a relatively low temperature and pressure, the pressure being approximately equal to the pressure at which the engine 10 exhausts. These gases pass through line 17 to a compressor 18 which may be of any suitable form driven by the internal combustion engine or a part of it, as for example, if the crank space of the engine were utilized as a compressor chamber. The compressed gas from compressor 18 then passes through pipe 19 to a three-way valve 20 where the gas is divided into two streams. It will be appreciated that the compressed gases at this point contain only the products of combustion of the engine and varying small amounts of residual oxygen. It is, therefore, necessary to replenish the oxygen supply and to remove unnecessary diluents before the gas can again be utilized in the power cylinder of the engine.

The three-way valve 20 may be of any suitable form capable of diverting a portion of the gas to each of two outgoing lines designated 22 and 23. It will be apparent that a greater or less amount may be diverted to either of the lines to maintain proper concentration of the gaseous constituents as will be hereafter apparent.

The gases in line 23 are passed into a heat exchanger or sea water cooler 24 of any convenient form where the temperature is lowered and additional water vapor extracted therefrom. This gas, as is usually the case in combustion devices, contains a high concentration of carbon dioxide and also contains argon which originated in the oxygen supply, in addition to the water vapor formed by combustion. Commercial liquid oxygen is approximately 99.7% pure and contains as much as 0.3% of argon. However, since a high concentration of argon is desirable in the operation of the engine oxygen of lower purity and coincidentally lower cost can be used. It is desired to maintain the argon concentration at a relatively high value as much as 20% since argon is a heavy gas and, therefore, develops more power in an engine of given size under the same pressure and temperature conditions than would a light gas. Further, the argon being monatomic, its adiabatic exponent is high so that the thermodynamic efficiency of a heat cycle including this gas is relatively great. For example, in a Brayton constant pressure cycle efficiency is calculated as:

$$E = 1 - \left(\frac{1}{Pr}\right)^{\frac{k-1}{k}}$$

The value of $k$ for argon is 1.67 while for diatomic gases such as nitrogen, oxygen, and carbon monoxide the value of $k$ is about 1.38 while the value for triatomic gases such as carbon dioxide and water is in the region of 1.25.

Gases from the cooler 24 thus contain largely carbon dioxide, argon and oxygen. These gases are taken through pipe 25 to a forecooler 26 where the temperature of the gaseous mixture is greatly reduced. The temperature of the forecooler is reduced by two means, first, by the passage of cold gases enriched by oxygen supplied by a pump 30 and secondly, by the passage of liquified carbon dioxide through pipe 31 from a carbon dioxide disposal pump 42. Oxygen from pump 30 passes initially through a condenser 34 in a line 36 and subsequently through the forecooler in line 38 to enter the system at point 40 in a junction with line 22 as will be presently described.

The gases in line 25 having been considerably reduced in the temperature in the forecooler are further reduced in temperature in line 27 in the condenser 34 by the initial evaporation of compressed oxygen and argon from a suitable supply bottle introduced by pump 30. The degree of temperature reduction at this point is such that a large portion of the carbon dioxide in the stream under treatment is liquified but the argon, having a much lower boiling point, remains gaseous. The liquid thus formed passes through pipe 28 to trap 29 and carbon dioxide may be pumped therefrom by a pump 42 into line 31 which passes through the forecooler to a disposal valve 32. The gaseous argon passes through trap 29 and its concentration is adjusted at this point by pumping excess amounts as gas from the system via a separate pump 44 and the argon may be discharged as shown by the arrow. Whatever gaseous constituents are not removed from the system are passed through pipe 38 and mixed with the oxygen from pipe 36 prior to entering the forecooler. The mixture at this point is at low temperature, adequate for use in the forecooler but too cold to be used in an engine.

At point 40 the oxygen enriched mixture from the forecooler is added to the hot gases flowing in pipe 22. The temperature of the gases is thus lowered and the final proportions between the oxygen-carrying stream and the untreated stream in pipe 22 established. The combined streams can, therefore, be adjusted as to temperature and gas analysis and combined in passage 42 to be supplied to the intake manifold of the engine. Should it be necessary to add heat to the gases in passage 42 prior to supplying them to the engine such addition may be made by passing the gases through a heat exchanger supplied by exhaust gases from the exhaust ports 12 and prior to their entrance to heat exchanger 15.

Since the carbon dioxide is extracted in the form of a liquid from trap 29, having been liquified in condenser 34, it can be discharged after passing through the forecooler to a surrounding body of water and absorbed therein without the formation of vapor or gas to cause bubbles in the water. Further, the power required to dispose of the liquified carbon dioxide by means of pump 42 is very low, lower than would be the case if the carbon dioxide were extracted as a gas, and the system is thus economical in this respect.

While the invention has been described in conjunction with a specific arrangement of the components it should be expressly understood that the arrangement is illustrative only and that numerous modifications and changes may be made therein without departing from the spirit and scope of the appended claims.

What I claim is:

1. In a method of operating a power plant comprising an internal combustion engine, the steps which include compressing the products of combustion after energy has been extracted therefrom, dividing the compressed gas into two streams, reducing the temperature of one stream sufficiently to liquify carbon dioxide, removing liquified carbon dioxide from the system, removing argon in excess of a predetermined relative quantity, adding a mixture of oxygen and argon to the cooled stream, reuniting the oxygen-enriched stream with the other stream, and supplying the combined streams of gas as combustion supporting gas to the internal combustion engine.

2. The method in accordance with claim 1 in which the reduction in temperature of the cooled stream is caused in part by the evaporation of compressed oxygen and argon as these gases are expanded prior to addition to the stream.

3. The method in accordance with claim 1 in which the reduction in temperature of the cooled stream is caused in part by the evaporation of compressed oxygen and argon and in part by the passage of liquified carbon dioxide removed from the system.

References Cited in the file of this patent

UNITED STATES PATENTS

| | | |
|---|---|---|
| 644,922 | Johnson et al. | Mar. 6, 1900 |
| 740,864 | Jaubert | Oct. 6, 1903 |
| 881,803 | Jaubert | Mar. 10, 1908 |
| 1,099,445 | Jaubert | June 8, 1914 |
| 1,750,919 | Becker | Mar. 18, 1930 |